(12) United States Patent
Levanoni et al.

(10) Patent No.: US 6,658,422 B1
(45) Date of Patent: Dec. 2, 2003

(54) DATA MINING TECHNIQUES FOR ENHANCING REGIONAL PRODUCT ALLOCATION MANAGEMENT

(75) Inventors: Menachem Levanoni, Yorktown Heights, NY (US); Jerome M. Kurtzberg, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 09/633,830

(22) Filed: Aug. 7, 2000

(51) Int. Cl.[7] ............................................... G06F 17/30
(52) U.S. Cl. ...................................................... 707/102
(58) Field of Search ................................ 707/2, 3, 4, 5, 707/6, 10, 100, 101, 102, 104.1; 210/613; 700/48, 49, 115; 702/181; 705/10, 14, 26, 35, 400; 706/215; 709/232

(56) References Cited

U.S. PATENT DOCUMENTS 6,296,766 B1 * 10/2001 Breckenridge ............... 210/613
6,412,012 B1 *  6/2002 Bieganski et al. ........... 709/232

* cited by examiner

Primary Examiner—Diane D. Mizrahi
Assistant Examiner—Apu M Mofiz
(74) Attorney, Agent, or Firm—Stephen C. Kaufman, Esq.; McGinn & Gibb, PLLC

(57) ABSTRACT

A computer method for enhancing regional product allocation management. The method includes the steps of providing a demand database comprising a compendium of individual demand history; providing a supply database comprising a compendium of at least one of regional product allocation management solutions, regional product allocation information, and regional product allocation diagnostics; and, employing a data mining technique for interrogating the demand and supply databases for generating an output data stream, the output data stream correlating demand problem with supply solution.

18 Claims, 4 Drawing Sheets

DATA MINING TECHNIQUES FOR ENHANCING REGIONAL PRODUCT ALLOCATION MANAGEMENT

CROSS REFERENCE TO RELATED APPLICATIONS

This application is related to application Ser. No. 09/559,379 to Kurtzberg, et al. filed Apr. 27, 2000; and now pending to application Ser. No. 09/604,535 to Levanoni, et al. filed Jun. 27, 2000, now pending to application Ser. No 09/612,683 to Levanoni, et al. filed Jul. 10, 2000; now pending each of these applications is and commonly assigned.

BACKGROUND OF THE INVENTION

1. Field of the Invention

This invention relates to methodology for utilizing data mining techniques in the area of regional product allocation management.

2. Introduction to the Invention

Data mining techniques are known and include disparate technologies, like neural networks, which can work to an end of efficiently discovering valuable, non-obvious information from a large collection of data. The data, in turn, may arise in fields ranging from e.g., marketing, finance, manufacturing, or retail.

SUMMARY OF THE INVENTION

We have now discovered novel methodology for exploiting the advantages inherent generally in data mining technologies, in the particular field of regional product allocation management applications.

Our work proceeds in the following way.

We have recognized that a typical and important "three-part" paradigm for presently effecting regional product allocation management, is a largely subjective, human paradigm, and therefore exposed to all the vagaries and deficiencies otherwise attendant on human procedures. In particular, the three-part paradigm we have in mind works in the following way. First, a regional product allocation manager develops a demand database comprising a compendium of individual demand history—e.g., the demand's response to historical supply situations. Secondly, and independently, the regional product allocation manager develops in his mind a supply database comprising the regional product allocation manager's personal, partial, and subjective knowledge of objective retail facts culled from e.g., the marketing literature, the business literature, or input from colleagues or salespersons. Thirdly, the regional product allocation manager subjectively correlates in his mind the necessarily incomplete and partial supply database, with the demand database, in order to promulgate an individual's demand's prescribed regional product allocation management evaluation and cure.

This three-part paradigm is part science and part art, and captures one aspect of the problems associated with regional product allocation management. However, as suggested above, it is manifestly a subjective paradigm, and therefore open to human vagaries.

We now disclose a novel computer method which can preserve the advantages inherent in this three-part paradigm, while minimizing the incompleteness and attendant subjectivities that otherwise inure in a technique heretofore entirely reserved for human realization.

To this end, in a first aspect of the present invention, we disclose a novel computer method comprising the steps of:

i) providing a demand database comprising a compendium of demand retail history;

ii) providing a supply database comprising a compendium of at least one of regional product allocation management solutions, regional product allocation information, and. regional product allocation diagnostics; and iii) employing a data mining technique for interrogating said demand and supply databases for generating an output data stream, said output data stream correlating demand problem with supply solution.

The novel method preferably comprises a further step of updating the step i) demand database, so that it can cumulatively track the demand history as it develops over time. For example, this step i) of updating the demand database may include the results of employing the step iii) data mining technique. Also, the method may comprise a step of refining an employed data mining technique in cognizance of pattern changes embedded in each database as a consequence of supply results and updating the demand database.

The novel method preferably comprises a further step of updating the step ii) supply database, so that it can cumulatively track an ever increasing and developing technical regional product allocation management literature. For example, this step ii) of updating the supply database may include the effects of employing a data mining technique on the demand database. Also, the method may comprise a step of refining an employed data mining technique in cognizance of pattern changes embedded in each database as a consequence of supply results and updating the supply database.

The novel method may employ advantageously a wide array of step iii) data mining techniques for interrogating the demand and supply database for generating an output data stream, which output data stream correlates demand problem with supply solution. For example, the data mining technique may comprise inter alia employment of the following functions for producing output data: classification-neural, classification-tree, clustering-geoographic, clustering-neural, factor analysis, or principal component analysis, or expert systems.

In a second aspect of the present invention, we disclose a program storage device readable by machine to perform method steps for providing an interactive regional product allocation management database, the method comprising the steps of:

i) providing a demand database comprising a compendium of individual demand history;

ii) providing a supply database comprising a compendium of at least one of regional product allocation management solutions, regional product allocation information, and regional product allocation diagnostics; and iii) employing a data mining technique for interrogating said demand and supply databases for generating an output data stream, said output data stream correlating demand problem with supply solution.

In a third aspect of the present invention, we disclose a computer comprising:

i) means for inputting a demand database comprising a compendium of individual demand history;

ii) means for inputting a supply database comprising a compendium of at least one of regional product allocation management solutions, regional product allocation information, and regional product allocation diagnostics;

iii) means for employing a data mining technique for interrogating said supply databases; and iv) means for generating an output data stream, said output data stream correlating demand problem with supply solution. We have now summarized the invention in several of its aspects or manifestations. It may be observed, in sharp contrast with the prior art discussed above comprising the three part subjective paradigm approach to the problem of product allocation management, that the summarized invention utilizes inter alia, the technique of data mining. We now point out, firstly, that the technique of data mining is of such complexity and utility, that as a technique, in and of itself, it cannot be used in any way as an available candidate solution for enhancing product allocation management, to the extent that the problem of product allocation management is only approached within the realm of the human-subjective solution to product allocation management. Moreover, to the extent that the present invention uses computer techniques including e.g., data mining techniques, to an end of solving a problem of product allocation management, it is not in general obvious within the nominal context of the problem as we have defined it and the technique of data mining, how they are in fact to be brought into relationship in order to provide a pragmatic solution to the problem of product allocation management. It is rather, an aspect of the novelty and unobviousness of the present invention that it discloses, on the one hand, the possibility for using the technique of data mining within the context of product allocation management, and, morever, on the other hand, discloses illustrative methodology that is required to in fact pragmatically bring the technique of data mining to bear on the actuality of solving the problem of product alocation management.

BRIEF DESCRIPTION OF THE DRAWING

The invention is illustrated in the accompanying drawing, in which.

DETAILED DESCRIPTION OF THE PRESENT INVENTION

The detailed description of the present invention proceeds by tracing through three quintessential method steps, summarized above, that fairly capture the invention in all its sundry aspects. To this end, attention is directed to the flowcharts and neural networks of FIGS. 1 through 4, which can provide enablement of the three method steps.

Figure 1:
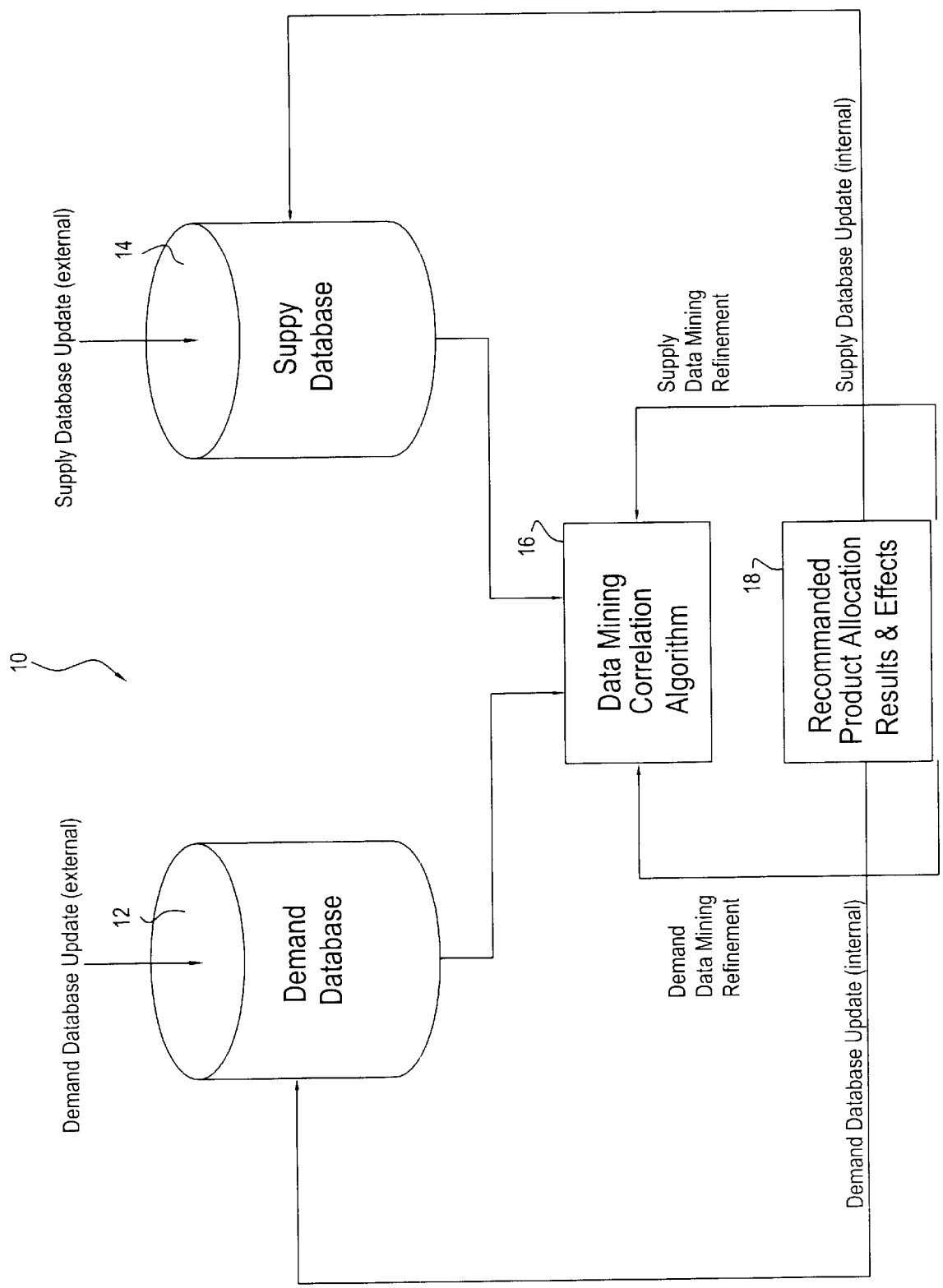
FIG. 1 provides an illustrative flowchart comprehending overall realization of the method of the present invention.

FIG. 1, numerals 10–18, illustratively captures the overall spirit of the present invention. In particular, the FIG. 1 flowchart (10) shows a demand database (12) comprising a compendium of individual demand history, and a supply database (14) comprising a compendium of at least one of regional product allocation management solutions, regional product allocation information, and regional product allocation diagnostics. Those skilled in the art will have no difficulty, having regard to their own knowledge and this disclosure, in creating or updating the databases (12,14) e.g., conventional techniques can be used to this end. FIG. 1 also shows the outputs of the demand database (12) and supply database (14) input to a data mining condition algorithm box (16). The data mining algorithm can interrogate the information captured and/or updated in the demand and supply databases (12,14), and can generate an output data stream (18) correlating demand problem with supply solution. Note that the output (18) of the data mining algorithm can be most advantageously, self-reflexively, fed as a subsequent input to at least one of the demand database (12), the supply database (14), and the data mining correlation algorithm (16).

Figure 2:
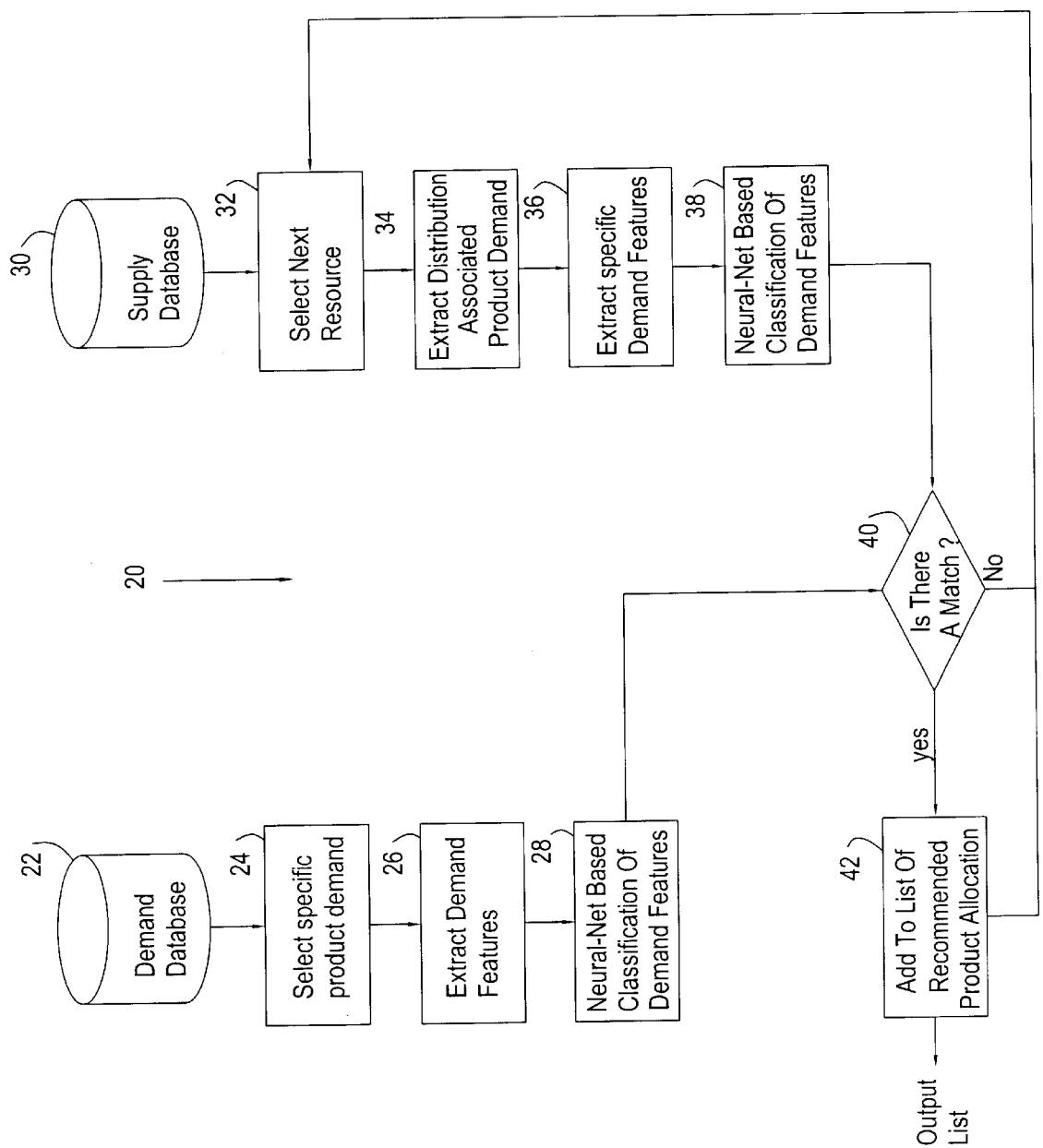
FIG. 2 provides an illustrative flowchart of details comprehended in the FIG. 1 flowchart.

Attention is now directed to FIG. 2, which provides a flowchart (20–42) that recapitulates some of the FIG. 1 flowchart information, but adds particulars on the immediate correlation functionalities required of a data mining correlation algorithm. For illustrative purposes, FIG. 2 comprehends the data mining correlation algorithm as a neural-net based classification of demand features, e.g., wherein a demand feature for say, men's shirts, may include shirt style, size, color, current local inventory, expected demand by week, as well as the specific region in which this particular demand was actualized.

Figure 3:
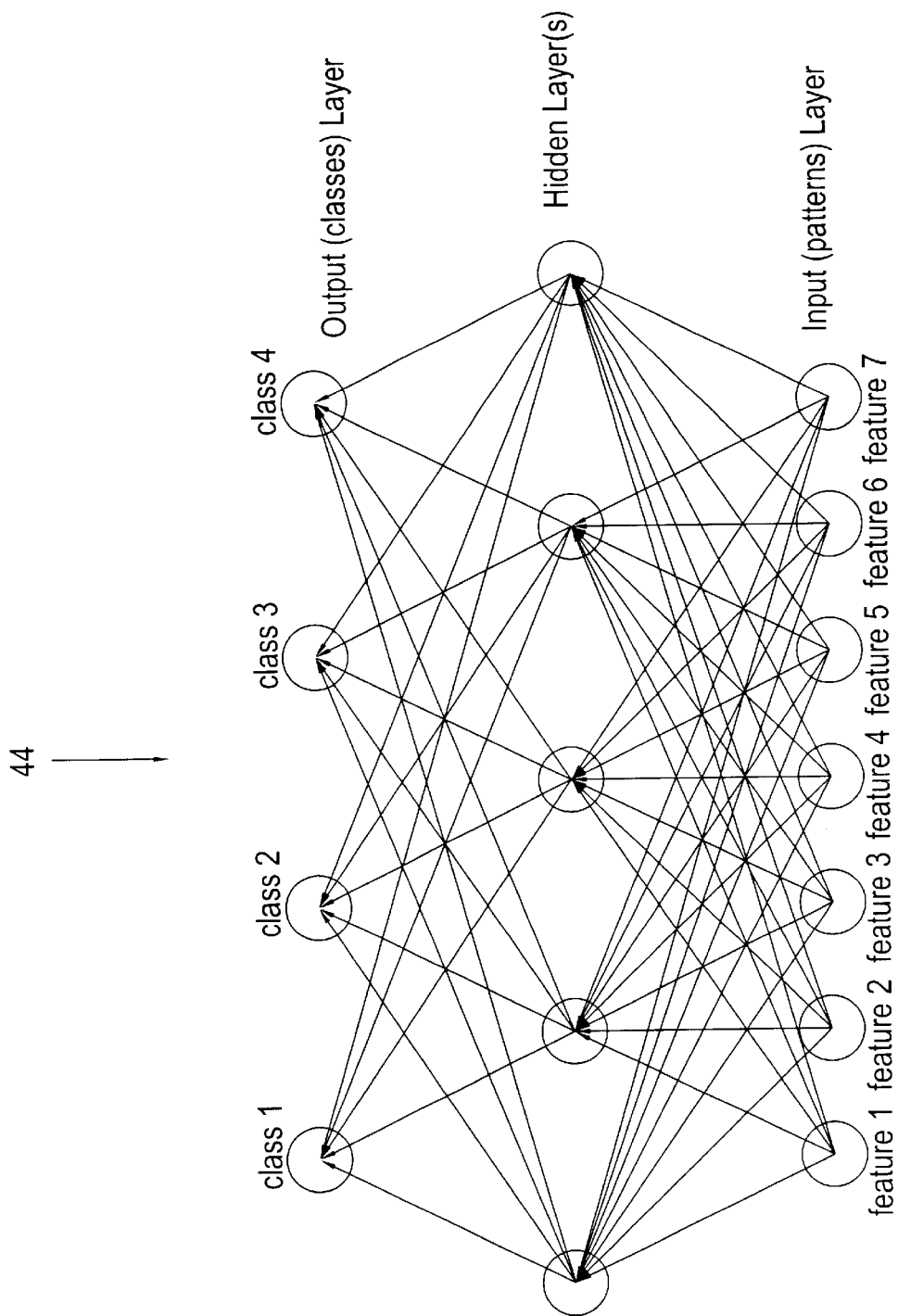
FIG. 3 shows a neural network that may be used in realization of the FIGS. 1 and 2 data mining algorithm.
Figure 4:
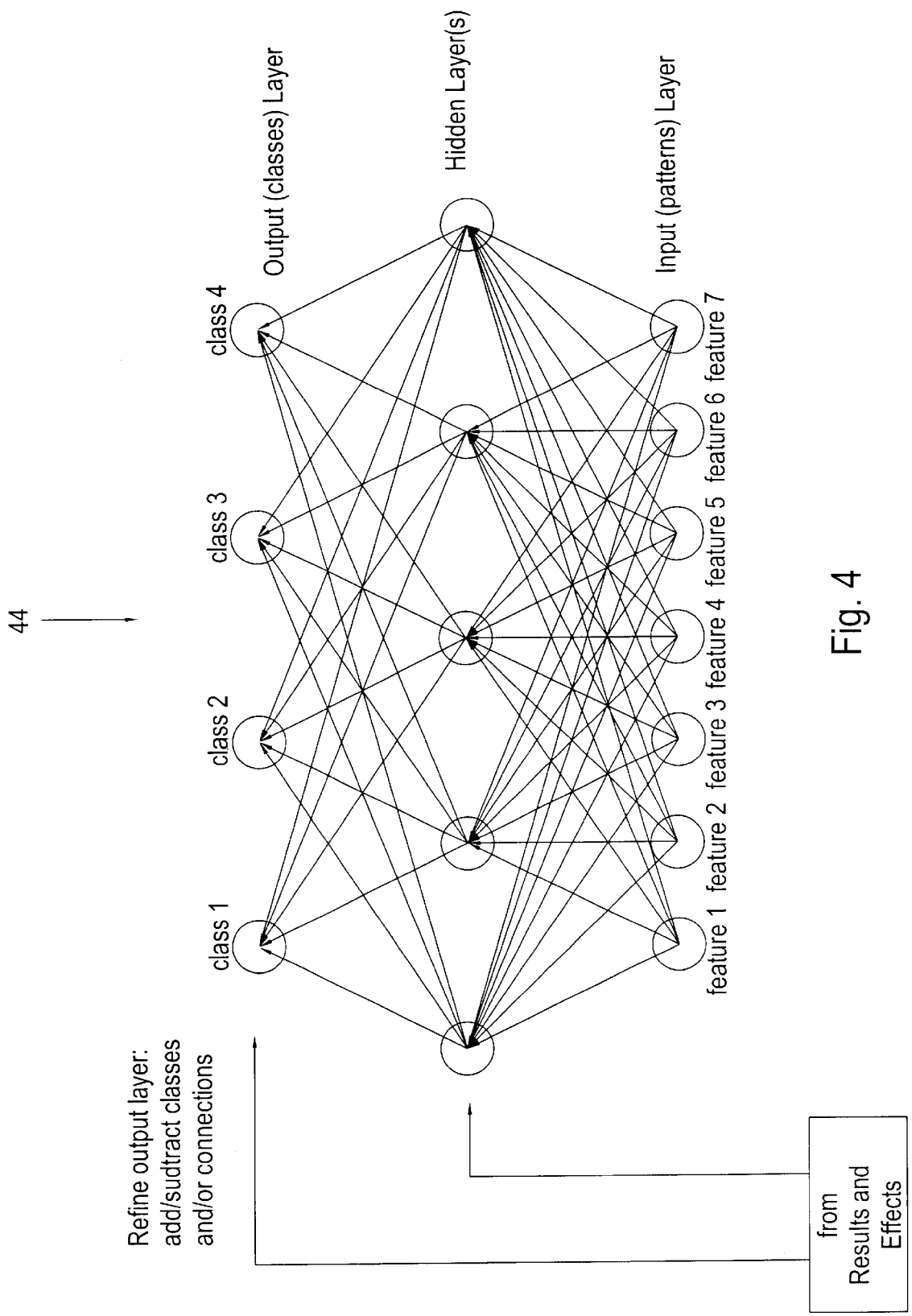
FIG. 4 shows further illustrative refinements of the FIG. 3 neural network.

FIG. 3, in turn, shows a neural-net (44) that may be used in realization of the FIGS. 1 and 2 data mining correlation algorithm. Note the reference to classes which represent classification of input features. The FIG. 3 neural-net (44) in turn, may be advantageously refined, as shown in the FIG. 4 neural-net (46), to capture the self-reflexive capabilities of the present invention, as elaborated above.

It is well understood that the computer system and method of the present invention can be implemented using a plurity of separate dedicated or programmable integrated or other electronic circuits or devices (e.g., hardwired or logic circuits such as discrete element circuits, or programmable logic devices such as PLDs, PLAs, PALs, or the like). A suitably programmed general purpose computer, e.g., a microprocessor, microcontroller, or other processor devices (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the figures can be used with the invention.

What is claimed:

1. A computer method comprising:
   providing a demand database comprising a compendium of individual demand history;
   providing a supply database comprising a compendium of at least one of regional product allocation management solutions, regional product allocation information, and regional product allocation diagnostics; and
   employing a data mining technique for interrogating said demand and supply databases for generating an output data stream, said output data stream correlating a regional demand problem with a regional supply solution,
   wherein the employing the data mining technique comprises employing neural networks as the data mining technique.

2. A method according to claim 1, further comprising: updating the demand database.

3. A method according to claim 2, wherein the updating the demand database comprises using the results of employing a data mining technique.

4. A method according to claim 2, further comprising:
   refining an employed data mining technique in cognizance of pattern changes embedded in each database as a consequence of updating the demand database.

5. A method according to claim 1, further comprising:
updating the supply database.

6. A method according to claim 5, wherein said updating the supply database comprises using the effects of the employing the data mining technique on the demand database.

7. A method according to claim 4, further comprising:
refining the employed data mining technique in cognizance of pattern changes embedded in each database as a consequence of updating the supply database.

8. The method according to claim 1, further comprising:
adding a product to a recommended regional product allocation if the data mining technique determines there is a match between a classification of a demand feature from the demand database and a classification of a demand feature from the supply database.

9. A program storage device readable by machine, tangibly embodying a program of instructions executable by the machine to perform method steps for providing an interactive regional product allocation management database, the method comprising:
providing a demand database comprising a compendium of individual demand history;
providing a supply database comprising a compendium of at least one of regional product allocation management solutions, regional product allocation information, and regional product allocation diagnostics; and
employing a data mining technique for interrogating said demand and supply databases for generating an output data stream, said output data stream correlating a regional demand problem with a regional supply solution,
wherein the employing the data mining technique comprises employing neural networks as the data mining technique.

10. The method according to claim 9, further comprising:
updating the supply database to include the effects of employing the data mining technique on the demand database.

11. The method according to claim 9, further comprising:
refining the employed data mining technique by analyzing pattern changes embedded in each database as a consequence of an updating of the demand database.

12. A computer comprising:
means for inputting a demand database comprising a compendium of individual demand history;
means for inputting a supply database comprising a compendium of at least one of regional product allocation management solutions, regional product allocation information, and regional product allocation diagnostics;
means for employing a data mining technique for interrogating said demand and supply databases; and
means for generating an output data stream, said output data stream correlating a regional demand problem with a regional supply solution,
wherein the means for employing the data mining technique comprises means for employing neural networks as the means for data mining technique.

13. The computer of claim 12, wherein said means for generating an output data stream adds a product to a recommended regional product allocation if the means for employing a data mining technique determines there is a match between a classification of a demand feature from the demand database and a classification of a demand feature from the supply database.

14. A regional product allocation management system, comprising:
a demand database comprising an individual demand history;
a supply database comprising a regional product allocation resources; and
a computerized data mining module for accessing said demand database and said supply database for generating an output data stream, said output data stream correlating a regional demand problem with a regional supply solution,
wherein said regional product allocation resources comprise a compendium of at least one of regional product allocation management solutions, regional product allocation information, and regional product allocation diagnostics and
wherein the accessing said demand database and said supply database for generating an output data stream comprises employing neural networks as a data mining technique.

15. The system according to claim 14, wherein the computerized data mining module further comprises a data mining technique using a cognizance of pattern changes embedded in said demand database and said supply database.

16. The system according to claim 14, wherein the data mining module comprises a data mining correlation algorithm, wherein said algorithm analyzes demand features including a specific region in which a particular demand was actualized.

17. A system according to claim 14, further comprising means for adding a product to a recommended regional product allocation if the data mining module determines there is a match between a classification of a demand feature from the demand database and a classification of a demand feature from the supply database.

18. A system according to claim 14, wherein the supply database cumulatively tracks regional product allocation management market research.

* * * * *